United States Patent [19]
Anderson et al.

[11] Patent Number: 5,787,448
[45] Date of Patent: Jul. 28, 1998

[54] DYNAMIC LINKING SYSTEM

[75] Inventors: David R. Anderson, Cupertino; Jack H. Palevich, Sunnyvale; Larry S. Rosenstein, Santa Clara; Arnold Schaeffer, Belmont, all of Calif.

[73] Assignee: Object Technology Licensing Corp., Cupertino, Calif.

[21] Appl. No.: 571,578

[22] Filed: Dec. 13, 1995

Related U.S. Application Data

[63] Continuation of Ser. No. 94,657, Jul. 19, 1993, abandoned.
[51] Int. Cl.$^6$ ........................................... G06F 9/06
[52] U.S. Cl. ........................... 707/501; 707/524; 707/530
[58] Field of Search .................................. 395/761–762, 395/766–769, 778, 784, 757, 335, 346; 707/501, 524, 530

[56] References Cited

U.S. PATENT DOCUMENTS

| | | | |
|---|---|---|---|
| 4,821,220 | 4/1989 | Duisberg | 364/578 |
| 4,885,717 | 12/1989 | Beck et al. | 395/704 |
| 4,891,630 | 1/1990 | Friedman et al. | 345/156 |
| 4,953,080 | 8/1990 | Dysart et al. | 707/103 |
| 4,975,690 | 12/1990 | Torres | 345/340 |
| 5,041,992 | 8/1991 | Cunningham et al. | 345/435 |
| 5,050,090 | 9/1991 | Golub et al. | 364/478.05 |
| 5,060,276 | 10/1991 | Morris et al. | 382/151 |
| 5,075,848 | 12/1991 | Lai et al. | 711/152 |
| 5,093,914 | 3/1992 | Coplien et al. | 395/704 |
| 5,119,475 | 6/1992 | Smith et al. | 345/353 |
| 5,125,091 | 6/1992 | Staas, Jr. et al. | 395/671 |
| 5,133,075 | 7/1992 | Risch | 707/201 |
| 5,136,705 | 8/1992 | Stubbs et al. | 395/183.03 |
| 5,142,618 | 8/1992 | Fujiwara et al. | 707/516 |
| 5,151,987 | 9/1992 | Abraham et al. | 395/182.18 |
| 5,181,162 | 1/1993 | Smith et al. | 707/530 |
| 5,396,630 | 3/1995 | Banda et al. | 395/683 |
| 5,404,534 | 4/1995 | Foss et al. | 395/683 |
| 5,408,599 | 4/1995 | Nomura et al. | 707/516 |
| 5,412,772 | 5/1995 | Monson | 345/335 |
| 5,421,012 | 5/1995 | Khoyi et al. | 395/677 |
| 5,430,836 | 7/1995 | Wolf et al. | 345/335 |
| 5,437,006 | 7/1995 | Turski | 707/503 |
| 5,481,666 | 1/1996 | Nguyen et al. | 345/357 |
| 5,537,546 | 7/1996 | Sauter | 345/329 |
| 5,559,942 | 9/1996 | Gough et al. | 345/349 |

FOREIGN PATENT DOCUMENTS 0 394 614  10/1990  European Pat. Off. .

OTHER PUBLICATIONS

Danuloff, The System 7 Book, 1991, p. 201–233.
Bishop, The Effect of Data Abstraction on Loop Programming Techniques, IEEE Transactions on Software Engineering, Apr. 1990, p. 389–402.
Shaw et al., Abstraction and Verification in Alphard: Deining and Specifying Iteration and Generators, Programming Language Design Tutorial, Wasserman(ed.), p. 145–155, Oct. 1980, reprint from Aug. 1977.
Robson, Object–Oriented Software Systems, Byte, Aug. 1981, p. 74–86.

(List continued on next page.)

*Primary Examiner*—Anton Fetting
*Attorney, Agent, or Firm*—Kudirka & Jobse

[57] ABSTRACT

A method and system for selecting a location in a first document, selecting a location in a second document, performing an action on the second document and performing the identical action on the first document at the defined location. An alternative embodiment links a first object to a second object and performs an action, such as launching an application of the second object, and remembering the location where the document was last accessed. Another embodiment, termed the whole model embodiment, provides an anchor to an entire object. The anchor enables an action to be applied to the whole object. For example, to copy data from a clipboard object, the copy command is directed to the anchor of the clipboard object. Still another embodiment provides an anchor representative of the first misspelled word or highest value in a document or a spreadsheet.

30 Claims, 5 Drawing Sheets

OTHER PUBLICATIONS

Coleman, Appealling WordPerfect Works Stumbles Over The Basics, MacWeek, Feb. 8, 1993, p. 60–61.

Gore, Claris 'Suite ' On Integration, MacWeek, Feb. 5, 1991, pp. 1–2

Saiedian et al., An Object–Based Approach to the Specification of Applications for Office Support Systems, System Sciences 1992 Hawaii Intl Conference, Jan. 1992, pp. 589–598.

Staff, Borland's Object Componenet Architecture, DBMS, Apr. 1992, pp. 3–4.

Scoville, Quattro Pro for Windows, PC World, Jul. 1992, pp. 102–105.

Rupley, Quattro Pro for Window's Notebook Metaphor, PC–Computing, Jul. 1992, pp. 66–67.

Staff, Quatro Pro & Paradox for Windows, EDGE Workgroup Computing Report, Apr. 27, 1992, p. 12.

LeVitus, Blessed Events, MacUser, Feb. 1992, pp. 265–267.

Courtrai et al., An Environment to Support Fragmented Active Objects, Second International Workshop on Object Orientation in Operating Systems, Sep. 24, 1992, pp. 124–128.

Blair et al., The Role of Operating Systems in Object Oriented Distributed Multimedia Platforms, Second International Workshop on Object Orientaton in Operationg Systems, Sep. 24, 1992, pp. 134–141.

Kempf et al., Cross Address Space Dynamic Linking, Object Orientation in Operating Systems, 1992, pp. 250–256.

"Microsoft Excel User's Guide," 1986, pp. 6,7,118,122,123, 188,189,191–194.

Acerson, "Wordperfect: The Complete Reference", 1988, pp. 93,94,166,167,171,172.

Hypertext '89 Proceedings "InterNote: Extending a Hypermedia Framework to Support Annotative Collaboration", Catlin, et al, pp. 365–378. Nov. 1989.

Yankelovich, et al. COMPUTER, Jan. 1988 "Intermedia: The Concept and the Construction of a Seamless Information Environment", pp. 81–96.

Meyrowitz, OOPSLA '86 Proceedings "Intermedia: The Architecture and Construction of an Object–Oriented Hypermedia System and Application Framework", Sep. 1986, pp. 186–201.

Proc. Int. Conf. Electronic Publ., Doc Manipulation & Typography 1990. Gaithersburg, GB, pp. 163–276, English et al. "An Extensible Object–Oriented System for Active Documents".

Computing Control Engineering Journal, V.4(3), Jun. 1993, pp. 119–126, Urban et al. "Engineering Data Management: Achieving Integation Through Database Technology".

FIG. 4

2 Letter.link example [v2.0] (WP)

I am pleased to report that our net earnings for March exceeded our wildest expectations. This was due entirely to your hard work, dilligence and craftyness. Please accept my thanks and appreciation for a job well done. As you can see, the net sales figures for this quarter were excellent.

|  | January | February | March |
|---|---|---|---|
| West | $2345.00 | $2344.00 | $2222.00 |
| East | $1223.00 | $1432.00 | $1523.00 |
| NET SALES | $3568.00 | $3776.00 | $3745.00 |

—410

As we begin our new quarter, I would like you to take the time to

Letter.link example [v2.0] (WP)

Dear Mr Gerard,

I am pleased to report that our net earnings for March exceeded our wildest expectations. As you can see, the net sales figures for this quarter were excellent.

|  | January | February | March |
|---|---|---|---|
| West | $2345.00 | $2344.00 | $2222.00 |
| East | $1223.00 | $1432.00 | $1523.00 |
| NET SALES | $3568.00 | $3776.00 | $3745.00 |

—420

If you have any questions, please don't hesitate to contact me. I look forward to seeing you at our annual sales conference.

Sincerely,

Page 1

100

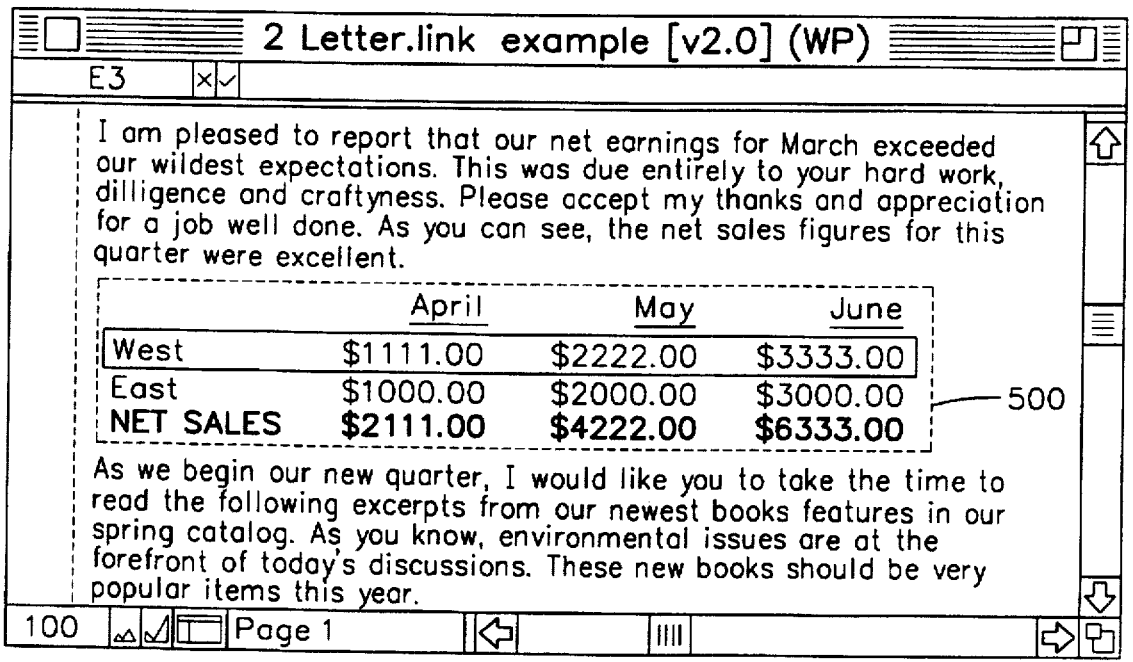
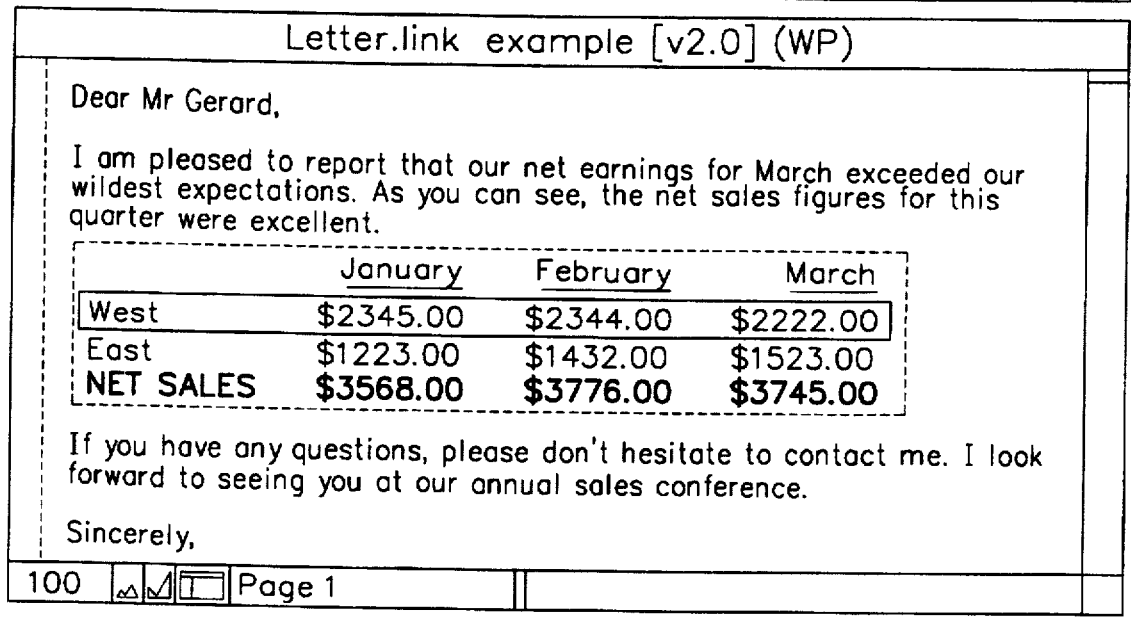
FIG. 5

2 Letter.link example [v2.0] (WP)

I am pleased to report that our net earnings for March exceeded our wildest expectations. This was due entirely to your hard work, dilligence and craftyness. Please accept my thanks and appreciation for a job well done. As you can see, the net sales figures for this quarter were excellent.

|  | April | May | June |
|---|---|---|---|
| West | $1111.00 | $2222.00 | $3333.00 |
| East | $1000.00 | $2000.00 | $3000.00 |
| NET SALES | $2111.00 | $4222.00 | $6333.00 |

As we begin our new quarter, I would like you to take the time to read the following excerpts from our newest books features in our spring catalog. As you know, environmental issues are at the forefront of today's discussions. These new books should be very popular items this year.

100 | Page 1

Letter.link example [v2.0] (WP)

B2 | 1111

I am pleased to report that our net earnings for March exceeded our wildest expectations. As you can see, the net sales figures for this quarter were excellent.

|  | April | May | June |
|---|---|---|---|
| West | $1111.00 | $2222.00 | $3333.00 |
| East | $1000.00 | $2000.00 | $3000.00 |
| NET SALES | $2111.00 | $4222.00 | $6333.00 |

— 600

If you have any questions, please don't hesitate to contact me. I look forward to seeing you at our annual sales conference.

Sincerely,

100 | Page 1

FIG. 6

DYNAMIC LINKING SYSTEM

This is a continuation of application Ser. No. 08/094,657 filed on Jul. 19, 1993, (now abandoned).

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS-REFERENCE TO RELATED PATENT APPLICATIONS

This patent application is related to the patent application entitled Object Oriented Framework System, by Debra L. Orton, David B. Goldsmith, Christopher P. Moeller, and Andrew G. Heninger, filed Dec. 23, 1992, and assigned to Taligent, the disclosure of which is hereby incorporated by reference.

FILED OF THE INVENTION

This invention generally relates to improvements in computer systems and more particularly to a system and method for linking operations and areas of information between documents.

BACKGROUND OF THE INVENTION

Document processing is currently the most prevalent application of personal computer technology. Examples of state of the art word processing technology include the WordPerfect® text processor and the Word text processor from Microsoft® Corporation. These products are designed to run on various operating systems and different hardware platforms. It would be convenient to share information between applications resident on a single hardware platform. This capability has been hard coded into some applications establishing an automatic update of business chart data by editing a graphic chart as illustrated in U.S. Pat. No. 4,674,043. However, dynamic anchoring of information in a first document and exchanging updates based on actions taken in a second document is not possible in today's word processing environment.

SUMMARY OF THE INVENTION

Accordingly, it is a primary objective of the present invention to provide a system and method for selecting a location in a first document, selecting a location in a second document, performing an action on the second document and automatically performing the identical action on the first document at the defined location. An alternative embodiment links a first object to a second object and performs an action, such as launching an application of the second object, and remembering the location where the document was last accessed. Another embodiment, termed the whole model embodiment, provides an anchor to an entire object. The anchor enables an action to be applied to the whole object. For example, to copy data from a clipboard object, the copy command is directed to the whole object anchor of the clipboard object. Still another embodiment provides an anchor representative of the first misspelled word or highest value in a document or a spreadsheet.

BRIEF DESCRIPTION OF THE DRAWINGS

FIG. 4 is an illustration of a document display illustrating two documents with their corresponding anchors;

FIG. 5 is an illustration of a document display when a first command has been executed on a first document in accordance with a preferred embodiment; and FIG. 6 is an illustration of a document display when a first command has been executed on a second anchored document in accordance with a preferred embodiment.

DETAILED DESCRIPTION OF THE INVENTION

Figures 1, 2:
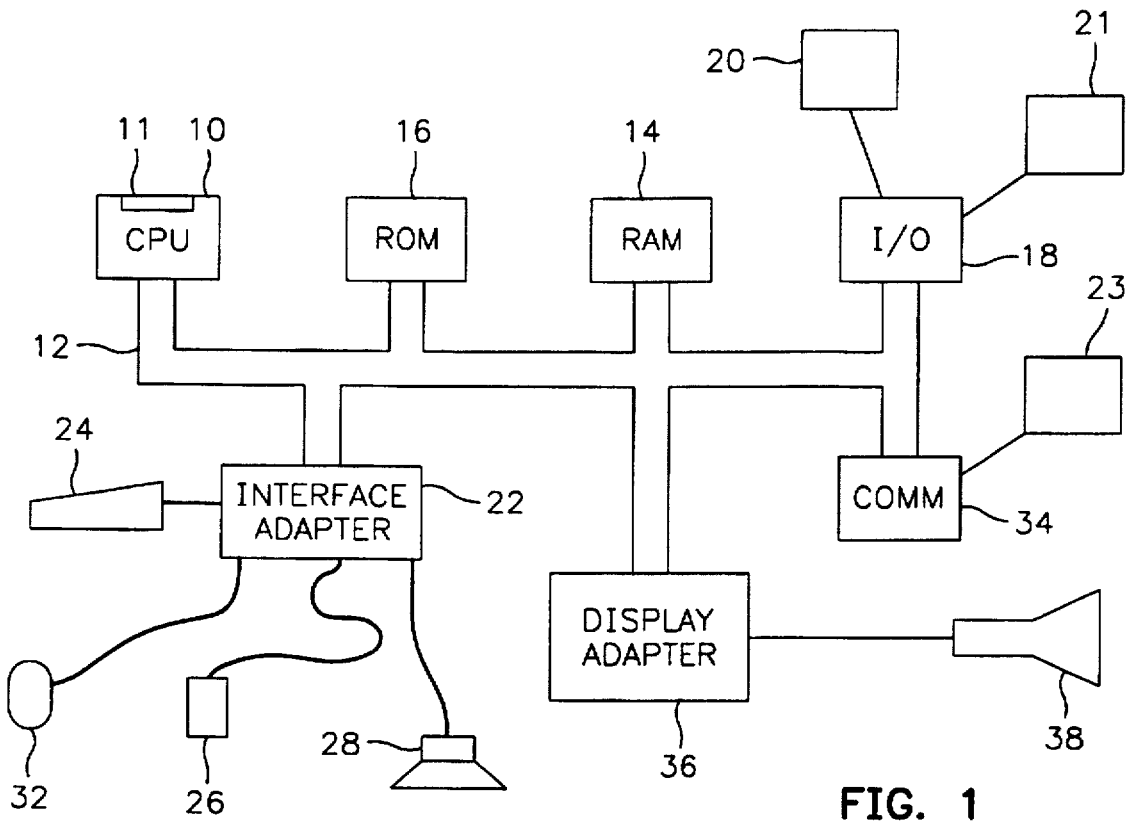
FIG. 1 is a block diagram of a personal computer system in accordance with a preferred embodiment.
FIG. 2 is an illustration of a document display with a selected area and an anchor in accordance with a preferred embodiment.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a workstation in accordance with the subject invention having a central processing unit 10, such as a conventional microprocessor, with a built in non-volatile storage 11, and a number of other units interconnected via a system bus 12. The workstation shown in FIG. 1 includes a Random Access Memory (RAM) 14, Read Only Memory (ROM) 16, an I/O adapter 18 for connecting peripheral devices such as a disk unit 20, and a diskette unit 21 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network 23 and a display adapter 36 for connecting the bus to a display device 38. The workstation has resident thereon an operating system such as the Apple System/7® operating system.

In a preferred embodiment, the invention is implemented in the C++ programming language using object oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and figures out according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise from the fact that while it is easy for a developer to reuse their own objects, it is difficult to use objects from other systems and the developer still needs to reach into the lower non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, *Reusing Object-Oriented Designs*, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scrollbars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and systems integrators have acquired expertise in particular areas, such as manufacturing, accounting, or currency transactions. This expertise is embodied in their code. Frameworks allow these development organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations who have acquired expertise in vertical markets such as manufacturing, accounting, or bio-technology would have a distribution mechanism for packaging, reselling, and deploying their expertise, and furthering the progress and dissemination of technology.

Historically, frameworks have only recently emerged as a mainstream concept on personal computing platforms. This migration has been assisted by the availability of object-oriented languages, such as C++. Traditionally, C++ was found mostly on UNIX systems and researcher's workstations, rather than on Personal Computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on what level of the system you are concerned with and what kind of problem you are trying to solve. The types of frameworks range from application frameworks that assist in developing the user interface, to lower level frameworks that provide basic system software services such as communications, printing, file systems support, graphics, etc. Commercial examples of application frameworks are MacApp (Apple), Bedrock (Symantec), OWL (Borland), NeXTStep App Kit (NeXT), and Smalltalk-80 MVC (ParcPlace) to name a few.

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using system framework would be to have separate I/O frameworks for SCSI devices, NuBus cards, and graphics devices. Because there is inherited functionality, each framework provides support for common functionality found in its device category. Other developers could then depend on these consistent interfaces to all kinds of devices.

A preferred embodiment takes the concept of frameworks and applies it throughout the entire system. For the commercial or corporate developer, systems integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc.

Application creation in the architecture of a preferred embodiment will essentially be like writing domain-specific puzzle pieces that adhere to the framework protocol. In this manner, the whole concept of programming changes. Instead of writing line after line of code that calls multiple API hierarchies, software will be developed by deriving classes from the preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. In a preferred embodiment, as shown in FIG. 1, a program resident in the RAM 14, and under the control of the CPU 10, is responsible for managing various tasks using an object oriented document framework.

Overview of Synchronization Links

The system's document architecture provides the technology for linking. One part of this architecture includes the presentation and commands for general purpose data-oriented links. The linking architecture will also be used to implement other features that may not resemble the general purpose data linking human interface, such as annotation. In addition, third party developers may use the linking architecture to implement special capabilities in their own applications, like a calendar, or a classic hypertext environment.

A synchronization link enables the same information to be seen in more than one location. The frequency and direction that the two pieces of information are updated with each other can be controlled at either end of the link. A link anchor is the special visual indication of the extent of the linked data in a document.

Creating Links

Creating a synchronization link is very similar to cut/copy and paste. To initiate a link, a user selects some data, using whatever means necessary and appropriate for the data type. Using the menu commands, the user would copy the selection. Then, in the desired destination, the user selects a command from a menu item and selects another command from the ensuing dialog box. Something can be copied, then pasted as a link later or more than once, even after the source document is closed. When the original source document is reopened, it will show the link anchor where the source data was copied from.

A direct manipulation method would be to choose a special drag-with-link tool to drag the selection to the new location. Holding down the option and command keys would be a shortcut for getting into this tool. This adds together the semantic of the other two modifier keys—the option key for copy and the command key for reference link. The modifier keys, therefore, are a shortcut for getting into a tool. The Link Preferences menu item is available after a selection was pasted (or option dragged) and is still selected. Then, a user could copy and paste something in the normal manner, then while the pasted information was still selected, turn the link on to facilitate application of the command to another document.

Deleting

Deleting a link that only receives information would be just like deleting any other object. The source object would at some point be informed that the receiver no longer exists. Deleting a link that sends out information may require an alert to notify the user that deleting the link will affect parts of other documents. When a document is opened, a notification indicates that the sending link no longer exists. When a link source is deleted, it's receiving links will be embedded or absorbed data.

Editing data

A user interacts with linked data as they would with any other embedded or absorbed data. When linked data is selected, the anchor showing the extent of the link and commands pertaining to the linking capabilities are available in the menus. Depending on the privileges of the document and the properties of the link, the user may be able to fully edit and make changes, or may be restricted to only making selections in the data. When linked data is editable at either end, changes made in one end appear at the other end, in accord with how frequently the link is set to be updated.

When a link's information flows only from one end to the other, the data on the receiving end is not editable, but it is selectable. Words and sentences can be selected inside a paragraph of linked text, for example. A document's privileges can also affect the editability of a link within that document. Linked information may be selectable but uneditable in a locked document. Selections containing links retain their links when copied and pasted. For example, copying and pasting a word from a linked sentence will copy and paste the link as well. Paste Special would allow the data to be pasted without the link. Linked extents can contain links, and overlap with other linked areas.

How much the information can be changed in one end of the link without affecting the other end of the link is dependent on the implementation of that type of data. It is possible that through the use of styles users can make local changes to linked data.

Following the link

The other end of the link can be found by getting preferences ("Get info" or "Link info" menu items) on the link. A preferences panel contains an actual reference link to the other end. Or at the very least, it could contain a button labeled "Open source", "Open destination", "Open other end", or a list of the other ends of the link if there are more than one.

Updating frequency and direction

A newly created synchronization link will be created with certain default properties. A new link will push data on demand from the user, and a single direction—from the source to the destination. It will not be editable in the destination. These settings were chosen because they are safe and understandable. Changes to the data flow only in the direction that the link was created—from where the link originated to the new location. Changes to the data will only happen when the user requests them to happen. The user must explicitly turn on the options to have changes to the data flow both directions, or update more frequently.

Preferences for the link can change any of these settings at either end of the link. The preference panel can be accessed whenever the link anchor is visible. A preference panel for a selected link will contain the following information and commands:

History of the link: created in . . . , goes to . . . , last updated on . . .

Update when: (default: none selected)
   on close
   on open
   on date & time
   on frequency Open Source/Destination/Other end document Unlink Update now Allow editing in destination (two way link)

Changes to the data can be "pushed" out to the other end of the link. If the document containing the other end of the link is open, it will receive notification that new information is available. If the receiving document is closed at the time, it will get the notification and the new information when it is opened. A link can also "pull" data from the other end of the link. This can happen regardless of whether the document containing the other end is open or closed. If nothing has changed in the other end, the data received may not visibly change.

A preferred embodiment creates dynamic anchors, which can be analogized to a sticky selection or a synchronized linkage. Selections are used to select a range (contiguous or discontiguous) of text or spreadsheet cells or a particular graphic in a draw document. An example of a selection is presented in FIG. 2 at 210. An anchor is a selection that is valid over time and enables the recall of the selection through some other means. Usually there is a marker 220 associated with the selection. A user can click on the marker to make the selection current again. A link in a preferred embodiment is a connection between two anchors. An example of a dynamic anchor operation occurs when two selections and two supported operations push data across a link and pull data on the link. A unique characteristic of a preferred embodiment is the ability to support a dynamic location rather then a fixed location for the link.

For example, if a user has two word processing documents, A and B, and an anchor is attached to a paragraph in document A and a corresponding paragraph in document B has another anchor attached to it, then data can be passed back and forth between the two documents using push and pull commands. The interesting thing about dynamic anchors is that the destination is unbound until the time that the link is activated. Rather than binding to a specific selection in a document, a dynamic binding can transpire. For example, a spelling checker can be dynamically bound to a document to select the first misspelled word in the document. Alternatively, by binding a spreadsheet, the largest value in the spreadsheet could be selected. Basically, the dynamic anchor allows a run time computation to occur to determine the actual, specific physical data you are linked to.

Given a prior art linkage model in which everything in the model has been selected, and a link attached to it, then when additions are made to the model, the linkage does not include the newly added data, it only includes what was selected initially. With the dynamic, whole model anchor of a preferred embodiment, all data of the model is included, no matter how much was added later. The anchor is computed at the moment data is requested. Then, if more data is added to the model, it computes a different range for the anchor then would have been active initially. A copy of the data in a model is retrieved when a copy operation is performed from the clipboard. Then, a publish link operation is performed to the dynamic anchor that represents all the data in that model, and whenever a paste of clipboard data is requested, a query of the link is performed to pull the data across the link. This architecture exploits the implementation of dynamic anchors and enhances the ability to pull information across anchors and links to implement a clipboard. No special code is necessary beyond what is used by normal pushing and pulling data across a link.

Figure 3:
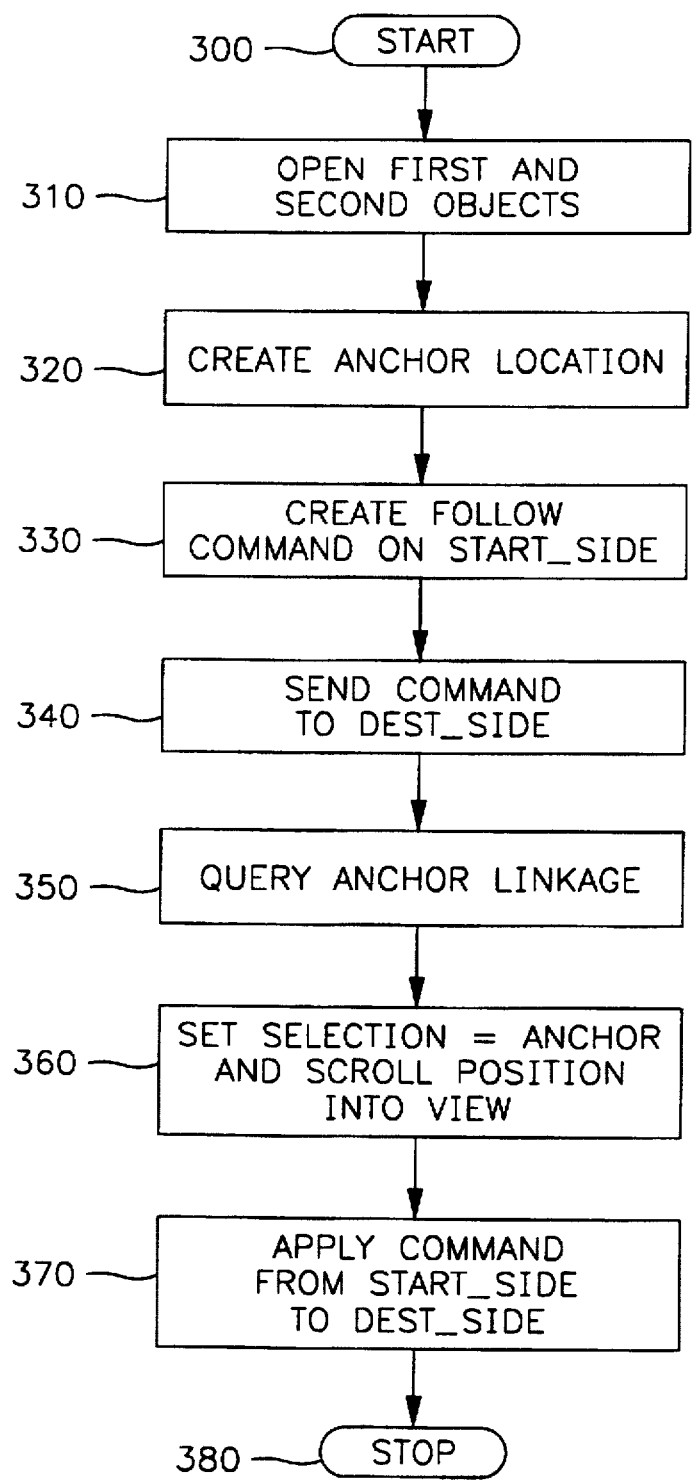
FIG. 3 is a flowchart presenting the processing that transpires in accordance with a preferred embodiment.

FIG. 3 is a flowchart presenting the processing that transpires in accordance with a preferred embodiment. Processing commences at terminal 300 and immediately passes to function block 310 where the first and second objects are opened. The objects could be text documents, graphic images, spreadsheets or other computer applications. Then, at function block 320, an anchor location is created in the two objects. The anchor merely marks a selection area and abstractly specifies an action. The action is resolved at follow or lookup time. Function block 330 illustrates the creation processing for the follow command on the start_ side. This processing selects the location of the link and creates the follow command at the start_side of the document. While this example has both the start_side and dest_side in two different documents, one of ordinary skill in the art will recognize that the two anchors could reside in the same document. Then, at function block 340, the command is sent to the dest_side to the other document's anchor. The send operation entails querying the linkage as shown in function block 350, setting the selection equal to the anchor, and scrolling the position of the anchor into view as set forth in function block 360. Then, the command applied at the start_side is applied at the dest_side as shown in function block 370. Finally, processing is completed at terminal 380.

FIG. 4 is an illustration of a document display illustrating two documents with their corresponding anchors. The two anchors appear at 410 and 420 as dashed lines around the selected area. As described above, the anchor in the source document 410 allows a command executed on the source document to be applied to the anchored destination document. FIG. 5 is an illustration of a document display when a first command has been executed on a first document in accordance with a preferred embodiment. The command in this case is an update of the sales numbers appearing in the anchored area 500.

FIG. 6 is an illustration of a document display when a first command has been executed on a second anchored document in accordance with a preferred embodiment. In FIG. 6, the source document has had a command applied to the anchored area at 600. The anchored area reflects the same changes as were made on the source document. Alternatively, in FIG. 6, the largest value in the spreadsheet could be selected from the dynamic anchor at 600. Basically, the dynamic anchor allows a run time computation to occur to determine the actual, specific physical data of interest to a user.

ANCHOR Program Listing
C++ language

```
/MAbstractModelAnchor/
class MAbstractModelAnchor : public MCollectible {
    public:
        virtual
        ~MAbstractModelAnchor();

virtual TStream&
        operator>>=(TStream& towhere) const;
        virtual TStream&
        operator<<=(TStream& fromwhere);
        virtual long Hash() const;
        virtual Boolean                         IsEqual(const
MCollectible*) const;
        virtual void PrintMe() const;
        VersionDeclarationsMacro(MAbstractModelAnchor);

TGlobalID GetUniqueID() const;
        virtual     void
SetUniqueID(const TGlobalID&);
        virtual     TModelSurrogate*
CopyModelSurrogate() const = 0;
        virtual     const TModelSurrogate*
GetModelSurrogate() const = 0;
        virtual     void
SetModel(const TAbstractModel&) = 0;
```

```
            protected:

MAbstractModelAnchor(const MAbstractModelAnchor&);

MAbstractModelAnchor();
                            MAbstractModelAnchor&
            operator=(const MAbstractModelAnchor&);
            private:
                    TGlobalID
            fUniqueID;

static const VersionInfo         kOriginalVersion;
    };
/*—*/
/*TModelAnchorSurrogate*/
class TModelAnchorSurrogate : public MAbstractModelAnchor {
            public:

TModelAnchorSurrogate(const TModelAnchorSurrogate&);

TModelAnchorSurrogate(const MAbstractModelAnchor&);

TModelAnchorSurrogate();
                    virtual
            ~TModelAnchorSurrogate();

TModelAnchorSurrogate&
            operator=(const TModelAnchorSurrogate&);
                            TModelAnchorSurrogate&
            operator=(const MAbstractModelAnchor&);

virtual TStream&
            operator>>=(TStream& towhere) const;
                    virtual TStream&
            operator<<=(TStream& fromwhere);
```

```
                virtual  void    PrintMe() const;
                MCollectibleDeclarationsMacro(TModelAnchorSurrogate);

virtual         TModelSurrogate*
5       CopyModelSurrogate() const;
                virtual         const TModelSurrogate*
        GetModelSurrogate() const;
                virtual         void
        SetModel(const TAbstractModel&);
10
                // Check if surrogate is for valid anchor.
                virtual         Boolean
        IsValid() const;

15              virtual TModelAnchor* GetAnchor() const;

// Data exchange
                virtual         void
        CreatePreferredTypeList(TSequence& theTypes) const;
20              virtual         TTypeDescription*
        ChoosePreferredType(const TSequence& theChoices,
        ETypeAcceptKind&) const;
                virtual         TModel*
        CopyDataAndAnchors(const TTypeDescription& theType) const;
25
                // Constants
                static const TModelAnchorSurrogate&  kInvalidAnchor;

private:
30              TModelSurrogateStreamer         fModel;

static const VersionInfo         kOriginalVersion;
        };
        /*—*/
35      /*TModelAnchor*/
        class TModelAnchor : public MAbstractModelAnchor, public TModelSelection
```

```
{
    public:

TModelAnchor(const TAbstractModel&, const TTime& modifydate );

TModelAnchor(const TModelSelection&, const TTime& modifydate);

TModelAnchor(const TModelAnchor&);

TModelAnchor();
                            TModelAnchor&
        operator=(const TModelAnchor&);
            virtual ~TModelAnchor();

virtual Boolean             IsEqual(const
        MCollectible*) const;
            virtual TStream&
        operator>>=(TStream& towhere) const;
            virtual TStream&
        operator<<=(TStream& fromwhere);
            virtual void                PrintMe() const;
            MCollectibleDeclarationsMacro(TModelAnchor);

virtual     void                    Touch();
            virtual     void
        GetModifyDate(TTime& theDate) const;
            virtual     void
        SetModifyDate(const TTime& theDate);

virtual     void
        SetSelection(const TModelSelection& theSelection);
            virtual     void
        AdoptSelection(TModelSelection* theSelection);
            virtual     const TModelSelection* GetSelection() const;
```

```
                virtual      void              Follow(const
        TModelLinkSurrogate& theLink);
                virtual      void              Execute(const
        TModelLinkSurrogate& theLink, TModelCommand& theCommand);
5
                // TModelSelection overrides
                virtual      TModelAnchor*
        CreateAnchor() const;
                virtual Boolean
10      IsAnchorable() const;
                virtual Boolean                IsReadable()
        const;
                virtual Boolean                IsWriteable()
        const;
15              virtual Boolean                IsClearable()
        const;
                virtual      void
        SetModel(const TAbstractModel& theModel);
                virtual      TModelSurrogate*
20      CopyModelSurrogate() const;
                virtual      const TModelSurrogate*
        GetModelSurrogate() const;
                virtual      void
        SetPresentation(const TPresentation& thePresentation);
25              virtual      void
        SetPresentation(const TPresentationSurrogate& thePresentation);

virtual      void
        CreatePreferredTypeList(TSequence& theTypes) const;
30              virtual      TTypeDescription*
        ChoosePreferredType(const TSequence& theChoices,
        ETypeAcceptKind&) const;
                virtual      TModel*
        CopyDataAndAnchors() const;
35              virtual      TModel*
        CopyDataAndAnchors(const TTypeDescription& theType) const;
```

```
            virtual     TModel*
    AbsorbDataAndAnchors(TModel* theData,

TModelSelection*&
    theNewSelectionIfDifferent);
            virtual     TModel*
    AbsorbDataAndAnchorsForUndoRedo(TModel* theData);
            virtual     TModel*
    EmbedDataAndAnchors(TModel* theData, TModelSelection*& theNewSelectionIfDifferent);
            virtual     TModel*
    ClearDataAndAnchors(TModelSelection*&
    theNewSelectionIfDifferent);
            virtual     TModel*
    ClearDataAndAnchorsForUndoRedo();
            virtual     TModel*
    ImportDataAndAnchors(TModel*) const;
            virtual     Boolean IsA(const TToken& theType) const;
            virtual     Boolean     IsValid() const;
            virtual     void    SetValid(Boolean isValid = TRUE);
            virtual     Boolean     IsEmpty() const;
            virtual     void
    AddAnchor(const MAbstractModelAnchor& anAnchor);
            virtual     void
    RemoveAnchor(const MAbstractModelAnchor& anAnchor);
            virtual     void
    RemoveAllAnchors();
            virtual     TIterator*
    CreateAnchorIterator() const;
            virtual     void
    AddModel(const TAbstractModel& aModel);
            virtual     void
    RemoveModel(const TAbstractModel& aModel);
            virtual     void    RemoveAllModels();
```

```
         virtual        TIterator*
CreateModelIterator() const;
         virtual        TIterator*
CreateSelectionIterator() const;
         virtual        TModelSelection*
CopyAndExtendToStart() const;
         virtual TModelSelection*
CopyAndExtendToEnd() const;

// Anchor attributes
         virtual        void AddAttribute(const TAttribute&
theAttribute);
         virtual        void DeleteAttribute(const TAttribute&
theName);
         virtual        const TAttribute*
LookupAttribute(const TAttribute& theName) const;
         virtual        void
DeleteAllAttributes();
         virtual TIterator*
CreateAttributeIterator() const;

// Links
         virtual        void
AdoptLink(TModelLink* aLink);
         virtual        TModelLink*
OrphanLink(const TAbstractModelLink& aLink);
         virtual        TModelLink*
LookupLink(const TModelLinkSurrogate& aLink);
         virtual        void
DeleteAllLinks();
         virtual        TIterator*
CreateLinkIterator() const;

virtual        void
SetVisibility(Boolean visible = TRUE);
```

```
        virtual    Boolean
GetVisibility() const;
        virtual    Boolean
        IsDynamic() const;

private:
        TTime    fModifyStamp;
        TModelSelection*        fSelection;
        TSimpleAttributeGroup*  fAttributes;
        TDeque fLinks;
        Boolean fVisible;

static const VersionInfo    kOriginalVersion;

#ifndef NO_INTERNAL
        public:
                virtual    void
        FinalizeAfterLookup();
#endif
};

/*—*/

/*TDynamicAnchor*/
class TDynamicAnchor : public TModelAnchor {
        public:
                virtual
        ~TDynamicAnchor();

virtual TStream&
        operator>>=(TStream& towhere) const;
                virtual TStream&
        operator<<=(TStream& fromwhere);
                virtual void PrintMe() const;
                VersionDeclarationsMacro(TDynamicAnchor);
```

```
        // TModelAnchor overrides
        virtual     void
    SetVisibility(Boolean);
        virtual     Boolean
    GetVisibility() const;
        virtual     Boolean IsDynamic() const;

virtual     void
    FinalizeAfterLookup();

protected:

TDynamicAnchor(const TAbstractModel&, const TGlobalID&);

TDynamicAnchor(const TDynamicAnchor&);

TDynamicAnchor();
        TDynamicAnchor& operator=(const TDynamicAnchor&);

virtual     TModelSelection* CreateDynamicSelection() const =
    0;

private:

static const VersionInfo        kOriginalVersion;
    };
    /*—*/
    /*TCurrentSelectionAnchor*/
    class TCurrentSelectionAnchor : public TDynamicAnchor {
        public:

TCurrentSelectionAnchor(const TAbstractModel&);

TCurrentSelectionAnchor(const TCurrentSelectionAnchor&);
```

```
                    TCurrentSelectionAnchor&
       operator=(const TCurrentSelectionAnchor&);
                virtual ~TCurrentSelectionAnchor();

5              virtual TStream&
       operator>>=(TStream& towhere) const;
                virtual TStream&
       operator<<=(TStream& fromwhere);
                virtual void              PrintMe() const;
10              MCollectibleDeclarationsMacro(TCurrentSelectionAnchor);

protected:

TCurrentSelectionAnchor();
15
                virtual     TModelSelection* CreateDynamicSelection()
       const;

private:
20
                static const VersionInfo         kOriginalVersion;
       };
       /*—*/
       /*TWholeModelAnchor*/
25     class TWholeModelAnchor : public TDynamicAnchor {
                public:

TWholeModelAnchor(const TAbstractModel&);

30              TWholeModelAnchor(const TWholeModelAnchor&);
                           TWholeModelAnchor&
       operator=(const TWholeModelAnchor&);
                virtual ~TWholeModelAnchor();

35              virtual TStream&
       operator>>=(TStream& towhere) const;
```

```
                virtual TStream&
        operator<<=(TStream& fromwhere);
                virtual void            PrintMe() const;
                MCollectibleDeclarationsMacro(TWholeModelAnchor);
        protected:

TWholeModelAnchor();
                virtual    TModelSelection*    CreateDynamicSelection()
        const;

private:

static const VersionInfo      kOriginalVersion;
    };
    /*—*/

/*TAbstractModelLink*/
    class TAbstractModelLink : public MCollectible
    {
        public:
                virtual
                ~TAbstractModelLink();

TGlobalID
        GetUniqueID() const;
                virtual     void
        SetUniqueID(const TGlobalID&);
        const TModelAnchorSurrogate*    GetHere() const;

const TModelAnchorSurrogate*    GetThere() const;

VersionDeclarationsMacro(TAbstractModelLink);

virtual TStream& operator>>=(TStream& towhere) const;
                virtual TStream& operator<<=(TStream& fromwhere);
                virtual long    Hash() const;
```

```
            virtual Boolean                    IsEqual(const
    MCollectible*) const;
            virtual void PrintMe() const;

5       protected:

TAbstractModelLink();

TAbstractModelLink(const TAbstractModelLink&);
10
        TAbstractModelLink(const TModelAnchorSurrogate& here, const TModelAnchorSurrogate& there);
        TAbstractModelLink& operator=(const TAbstractModelLink&);
15
        private:
            TGlobalID
        fUniqueID;
            TModelAnchorSurrogate     fHere;
20          TModelAnchorSurrogate                  fThere;

static const VersionInfo         kOriginalVersion;
    };
    /*—*/
25  /*TModelLinkSurrogate*/
    class TModelLinkSurrogate : public TAbstractModelLink
    {
        public:

30      TModelLinkSurrogate(const TModelLinkSurrogate&);

TModelLinkSurrogate(const TAbstractModelLink&);

TModelLinkSurrogate();
35          virtual
        TModelLinkSurrogate();
```

```
            TModelLinkSurrogate& operator=(const TModelLinkSurrogate&);
            TModelLinkSurrogate&     operator=(const TAbstractModelLink&);

5           virtual TStream& operator>>=(TStream& towhere) const;
            virtual TStream& operator<<=(TStream& fromwhere);
            MCollectibleDeclarationsMacro(TModelLinkSurrogate);

// Check if surrogate is for valid link.
10          virtual      Boolean IsValid() const;

// Constants
            static const TModelLinkSurrogate&     kInvalidLink;

15          static const VersionInfo kOriginalVersion;
    };
    /*—*/
    /*TModelLink*/
    class TModelLink : public TAbstractModelLink
20  {
            public:

TModelLink(const TModelAnchorSurrogate& here, 25                  const TModelAnchorSurrogate& there);

TModelLink(const TModelLink&);

TModelLink();
30          virtual
    ~TModelLink();

TModelLink& operator=(const
    TModelLink&);
35
```

```
            virtual TStream&
    operator>>=(TStream& towhere) const;
            virtual TStream&
    operator<<=(TStream& fromwhere);
            MCollectibleDeclarationsMacro(TModelLink);

// Link attributes
            virtual     void
    AddAttribute(const TAttribute& theAttribute);
            virtual     void
    DeleteAttribute(const TAttribute& theName);
            virtual     const TAttribute*
    LookupAttribute(const TAttribute& theName) const;
            virtual     void
    DeleteAllAttributes();
            virtual TIterator*
    CreateAttributeIterator() const;

virtual     Boolean
    IsBidirectional() const;
            virtual     void
    SetBidirectional(Boolean = TRUE);

private:
            TSimpleAttributeGroup*         fAttributes;
            Boolean
    fBidirectional;

static const VersionInfo       kOriginalVersion;
    };
    /*—*/

/*TModelAnchorCollection*/
    // TModelAnchorCollection provides the abstract protocol for a collection of
    model anchors.
```

```
// This protocol is used by TModel to manage its list of anchors and links. This
class is
// abstract and may be subclassed to provide a specific implementation.
TModelAnchorCollections
// own their anchors and are responsible all associated memory management.

class TModelAnchorCollection : public MCollectible
{
        public:
                /* ..............................................................*/
                /* Constructors and Destructors*/

TModelAnchorCollection();

TModelAnchorCollection( const TModelAnchorCollection& );
                virtual
        ~TModelAnchorCollection();

TModelAnchorCollection&
        operator=(const TModelAnchorCollection&);

/*
                ..............................................................*/
                /* Overrides*/ virtual      TStream&
        operator>>= ( TStream& towhere ) const;
                virtual      TStream&
        operator<<= ( TStream& fromwhere );
                VersionDeclarationsMacro(TModelAnchorCollection);

/*
        ..............................................................*/
                /* Collection methods*/
```

```
virtual void Adopt( TModelAnchor* anAnchor ) = 0;
virtual TModelAnchor*Orphan( const MAbstractModelAnchor& ) = 0;
virtual TModelAnchor*Member( const MAbstractModelAnchor& )
        const = 0;
virtual unsigned long    Count() const = 0;
virtual TIterator*CreateIterator(Boolean includeInvisibleAnchors,
        Boolean includeDynamicAnchors) const = 0;
        virtual      void    AnchorsFixedUp() = 0;

private:
        static const VersionInfo kOriginalVersion;
};
/*—*/
/*TModelAnchorSet*/
// TModelAnchorSet is a concrete subclass of TModelAnchorCollection that implements the
// anchor collection using a TSet.

class TModelAnchorSet : public TModelAnchorCollection
{
    public:
/* ..........................................*/
    /* Constructors and Destructors*/

TModelAnchorSet();

TModelAnchorSet( const TModelAnchorSet& );
        virtual
    ~TModelAnchorSet();
    TModelAnchorSet& operator=(const TModelAnchorSet&);

/* ...........................................................*/
    /* Overrides*/
```

```
            virtual      TStream& operator>>= ( TStream& towhere ) const;
                virtual     TStream& operator<<= ( TStream&
        fromwhere );
                MCollectibleDeclarationsMacro(TModelAnchorSet);
5
                /*
        ...................................................................*/
                /* Collection methods*/

10      virtual void        Adopt( TModelAnchor* anAnchor );
        virtual TModelAnchor* Orphan( const MAbstractModelAnchor& );
        virtual TModelAnchor* Member( const MAbstractModelAnchor& )
                const;
                    virtual unsigned long   Count() const;
15              virtual TIterator*
        CreateIterator(Boolean includeInvisibleAnchors,
                        Boolean includeDynamicAnchors) const;
                virtual     void    AnchorsFixedUp();

20      private:
                TSet    fAnchors;

static const VersionInfo kOriginalVersion;
        };
25      /*—*/

/*TAnchorNotification*/
        class TAnchorNotification : public TNotification
        {
30          public:

TAnchorNotification(const TInterest& theInterest, const MAbstractModelAnchor& theAnchor);
35
```

```
            TAnchorNotification(const TAnchorNotification&);
                virtual
            ~TAnchorNotification();
5
                            TAnchorNotification&
            operator=(const TAnchorNotification&);

virtual     TStream&
10          operator>>=(TStream& towhere) const;
                virtual     TStream&
            operator<<=(TStream& towhere);
                    MCollectibleDeclarationsMacro(TAnchorNotification);

15              virtual     const TModelAnchorSurrogate&
            GetAnchorSurrogate() const;

protected:

20          TAnchorNotification();

private:
                    TModelAnchorSurrogate fAnchor;

25              static const VersionInfo kOriginalVersion;
        };
        /*—*/
        /*TModelLinkNotification*/
        class TModelLinkNotification : public TNotification
30      {
                public:

TModelLinkNotification(const TInterest& theInterest, 35              const TAbstractModelLink& theAnchor);
```

```
            TModelLinkNotification(const TModelLinkNotification&);
                virtual TModelLinkNotification();
                TModelLinkNotification&    operator=(const
5               TModelLinkNotification&);

virtual     TStream&
            operator>>=(TStream& towhere) const;
                virtual     TStream&
10          operator<<=(TStream& towhere);
                MCollectibleDeclarationsMacro(TModelLinkNotification);

virtual    const TModelLinkSurrogate&
            GetModelLinkSurrogate() const;
15          protected:
            TModelLinkNotification();
            private:
            TModelLinkSurrogate fLink;
            static const VersionInfo kOriginalVersion;
20      };
        /*—*/
```

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. An apparatus for document composition under control of an application program, comprising:
    (a) a processor;
    (b) a storage attached to the processor;
    (c) a display under the control of the processor;
    (d) a document having contents resident in the storage and presented on the display;
    (e) means controlled by the application program for selecting a first portion of the document contents and for constructing a first anchor object in the storage associated with the first selected document portion;
    (f) means controlled by the application program for constructing a second anchor object in the storage associated with the document;
    (g) means controlled by the application program for creating a link object to link the first and the second anchor objects the link object comprising means responsive to changes in the first document for applying a query command to the second anchor object and means in the second anchor object for selecting a second portion of the document based on the query command;
    (h) means in the first anchor object and controlled by the application program for applying a command to the first selected document portion to process the contents of the first selected document portion;
    (i) means in the first anchor object for sending the command to the second anchor object by means of the link object; and
    (j) means in the second anchor object for responding to the command by selecting a second portion of the document contents and applying the command to process the contents of the second selected portion.

2. The apparatus as recited in claim 1, wherein the link object comprises means responsive to changes in the first document for applying a spell check command to the second anchor object and means in the second anchor object for selecting a second portion of the document based on the spell check command.

3. The apparatus as recited in claim 1, wherein the link object comprises means responsive to changes in the first document for applying a select largest value command to the second anchor object and means in the second anchor object for selecting a second portion of the document based on the select largest value command.

4. The apparatus as recited in claim 1, wherein the link object comprises means responsive to changes in the first document for applying a select smallest value command to the second anchor object and means in the second anchor object for selecting a second portion of the document based on the select smallest value command.

5. A method for document composition under control of an application program on a processor with an attached storage and display, comprising the steps of:
    (a) loading a document having contents into the storage and presenting the document on the display;
    (b) selecting a first portion of the document contents in the storage and constructing a first anchor object associated with the first selected document portion in the storage;
    (c) constructing a second anchor object associated with the document contents in the storage;
    (d) creating a link object to link the first and the second anchor objects; and
    (e) applying a command to the first selected document portion contents to process the contents of the first selected document portion;
    (f) sending the command to the second anchor object and applying a query command to the second anchor object by means of the link object and;
    (g) receiving the command and the query command in the second anchor object and in response thereto selecting a second portion of the document contents based on the query command and applying the command to process the contents of the second selected document portion.

6. The method as recited in claim 5, wherein step (f3) comprises the step of:
    (f3a) applying a spell check query command to the second anchor object.

7. The method as recited in claim 5, wherein step (f3) comprises the step of:
    (f3b) applying a select largest value query command to the second anchor object.

8. The method as recited in claim 5, wherein step (f3) comprises the step of:
    (f3c) applying a select smallest value query command to the second anchor object.

9. An apparatus for dynamically linking a first document to a second document under control of an application program so that changes made in one document are made to the other document, the apparatus being operable in a computer system having a processor, means controlled by the application program for selecting a portion of the first document and a display for displaying portions of the first and the second documents, the apparatus comprising:
    (a) means responsive to a selection of a first document portion for constructing a first anchor object having data identifying the selected first document portion;
    (b) means responsive to a selection of the first document portion for constructing a second anchor object having data identifying a portion of the second document to be selected;
    (c) means responsive to the construction of the second anchor object for creating a link object having methods for streaming data between the first and the second anchor objects;
    (d) means controlled by the first anchor object for creating a command object having methods for modifying documents and for applying the command object methods to the selected first document portion;
    (e) means in the first anchor object for providing the command object to the link object in order to stream the command object from the first anchor object to the second anchor object;
    (f) means responsive to the streamed command object for selecting a portion of the second document; and
    (g) means responsive to the selection of the second document portion for applying the command object methods to the selected second document portion.

10. An apparatus as recited in claim 9 further comprising:
    (h) means controlled by the second anchor object for creating a second command object having methods for modifying documents and for applying the command object methods to the selected second document portion;
    (i) means in the second anchor object for providing the second command object to the link object in order to stream the command object from the second anchor object to the first anchor object; and
    (j) means responsive to the streamed command object for applying the command object methods to the selected first document portion.

11. An apparatus as recited in claim 9 wherein the means for providing the command object to the link object comprises means for periodically streaming a command object from the first anchor to the second anchor in order to periodically update the selected second document portion.

12. An apparatus as recited in claim 9 wherein the first anchor object comprises means for streaming a pull command object from the first anchor object to the second anchor object and means in the second anchor object responsive to the pull command object for returning data from the second anchor object to the first anchor object.

13. An apparatus as recited in claim 9 wherein the second anchor object comprises means responsive to a command object for displaying the second document on the display.

14. An apparatus as recited in claim 13 wherein the second anchor object comprises means responsive to a command object for displaying the selected second document portion on the display.

15. An apparatus as recited in claim 9 wherein the first anchor object comprises means for streaming a query command object from the first anchor object to the second anchor object and means in the second anchor object responsive to the query command object for examining the second document and for selecting a portion of the second document based on the query command.

16. An apparatus as recited in claim 9 wherein the second anchor object comprises data identifying a point in the second document at which data will be selected.

17. An apparatus as recited in claim 16 wherein the means for selecting a portion of the second document comprises means responsive to the streamed command object for determining the extent of the portion of the second document which is selected.

18. An apparatus as recited in claim 9 wherein the means for selecting a portion of the second document comprises means responsive to the streamed command for identifying a point in the second document at which data will be selected.

19. An apparatus as recited in claim 18 wherein the means for selecting a portion of the second document comprises means responsive to the streamed command object for determining the extent of the portion of the second document which is selected.

20. A method for dynamically linking a first document to a second document under control of an application program so that changes made in one document are made to the other document, the method being operable in a computer system having a processor, means controlled by the application program for selecting a portion of the first document and a display for displaying portions of the first and the second documents, the method comprising the steps of:

(a) constructing a first anchor object having data identifying the selected first document portion;

(b) constructing a second anchor object associated with the second document;

(c) creating a link object having methods for streaming data between the first and the second anchor objects;

(d) creating a command object having methods for modifying documents and applying the command object methods to the selected first document portion;

(e) using the link object to stream the command object from the first anchor object to the second anchor object;

(f) receiving the command object in the second anchor object and selecting a portion of the second document based on the command object; and (g) applying the command object methods to the selected second document portion identified in the second anchor object.

21. A method as recited in claim 20 further comprising the steps of:

(h) creating a second command object having methods for modifying documents and applying the command object methods to the selected second document portion;

(i) using the link object to stream the command object from the second anchor object to the first anchor object;

(j) receiving the command object in the first anchor object; and (k) applying the command object methods to the selected first document portion.

22. A method as recited in claim 20 wherein step (e) comprises the step of:

(e1) periodically streaming a command object from the first anchor to the second anchor in order to periodically update the selected second document portion.

23. A method as recited in claim 20 wherein step (d) comprises the step of:

(d1) creating a pull command object;

step (e) comprises the step of:

(e2) streaming the pull command object from the first anchor object to the second anchor object; and step (g) comprises the step of:

(g1) returning data from the second anchor object to the first anchor object in response to the pull command object.

24. A method as recited in claim 20 wherein step (g) comprises the step of:

(g2) displaying the second document on the display.

25. A method as recited in claim 24 wherein step (g2) comprises the step of:

(g2a) displaying the selected second document portion on the display.

26. A method as recited in claim 20 wherein step (d) comprises the step of:

(d2) creating a query command object;

step (e) comprises the step of:

(e3) streaming the query command object from the first anchor object to the second anchor object; and step (g) comprises the step of:

(g3) examining the second document and selecting a portion of the second document in response to the query command object.

27. A method as recited in claim 20 wherein step (b) comprises the step of;

(b1) constructing a second anchor object including data identifying a point in the second document at which data will be selected.

28. A method as recited in claim 27 wherein step (f) comprises the step of:

(f1) determining the extent of the portion of the second document which is selected in response to the streamed command object.

29. A method as recited in claim 20 wherein step (f) comprises the step of:

(f2) identifying a point in the second document at which data will be selected in response to the streamed command.

30. A method as recited in claim 29 wherein the step (f) comprises the step of:

(f3) determining the extent of the portion of the second document which is selected in response to the streamed command object.

* * * * *